United States Patent
Boucher et al.

[11] Patent Number: 5,884,246
[45] Date of Patent: Mar. 16, 1999

[54] SYSTEM AND METHOD FOR TRANSPARENT TRANSLATION OF ELECTRONICALLY TRANSMITTED MESSAGES

[75] Inventors: Guillaume Boucher, Larmor Plage, France; Joel Gaillard; Charles Villeneuve, both of Nassau, Bahamas

[73] Assignee: Transgate Intellectual Properties Ltd., Nassau N. P., Bahamas

[21] Appl. No.: 760,645

[22] Filed: Dec. 4, 1996

[51] Int. Cl.⁶ .............................. G06F 17/28; G06F 13/38
[52] U.S. Cl. ............................................. 704/2; 395/200.36
[58] Field of Search ....................... 704/1–7; 395/200.36, 395/200.37

[56] References Cited

U.S. PATENT DOCUMENTS

| | | | |
|---|---|---|---|
| 4,870,610 | 9/1989 | Belfer | 704/4 |
| 5,075,850 | 12/1991 | Asahioka et al. | 704/2 |
| 5,268,839 | 12/1993 | Kaji | 704/3 |
| 5,497,319 | 3/1996 | Chong et al. | 704/2 |
| 5,568,383 | 10/1996 | Johnson et al. | 704/2 |
| 5,701,497 | 12/1997 | Yamauchi et al. | 704/1 |
| 5,706,434 | 1/1998 | Kremen et al. | 395/200.09 |
| 5,715,466 | 2/1998 | Flanagan et al. | 704/2 |
| 5,764,906 | 6/1998 | Edelstein et al. | 395/200.49 |

OTHER PUBLICATIONS

Ed Bott, "What's in a Name?", Inter.net, Oct. 1996, USA.
"The Ultimate Web Browser", Superguide, Oct. 1966, USA.
"Remailer List", http:/www.cs.berkeley.edu/raph/remailer–lst.html, Nov. 9, 1996.
Deborah Weil. "Finding and Using Anonymous Remailers", http://www.wordbiz.com/remailside.html, Nov. 9, 1996.
"Instructions for Using Anonymous Remailer", http://remailer.nl.com/remailer/remailer–help, Nov. 9, 1996.

Primary Examiner—David R. Hudspeth
Assistant Examiner—Patrick N. Edouard
Attorney, Agent, or Firm—Thorpe, North & Western, L.L.P.

[57] ABSTRACT

A system and method for translating communications transmitted via a computer network from a first language to a second language, and particularly via the Internet is described. The communication is conveyed to a central translation site where it is translated and then conveyed to the destination site. In one preferred arrangement, the destination address for the communication includes a first level domain field, a second level domain field, and a username field which complies with the Internet Protocol. At the origination site, a translation address is concatenated onto the destination address so that the communication is delivered to the translation site before being delivered to the destination site. At the translation site the communication is translated from the first language into at least the second language to generate a translated communication. The address of the translation site is then removed from the destination address and the translated communication is conveyed via the computer network to arrive at the site designated by the destination address where it is received and reproduced in a humanly perceptible manner such that an intended recipient can comprehend the contents of the translated communication.

31 Claims, 9 Drawing Sheets

200 ----- PREPARING AN ORIGINAL COMMUNICATION FOR ELECTRONIC TRANSMISSION

202 ----- PROVIDING A DESTINATION ADDRESS FOR THE ORIGINAL COMMUNICATION INCLUDING AT LEAST A FIRST LEVEL DOMAIN FIELD, A SECOND LEVEL DOMAIN FIELD, AND A USERNAME FIELD

240 ----- DETERMINING AT LEAST ONE TRANSLATION PARAMETER TO BE APPLIED TO THE ORIGINAL COMMUNICATION (E. G., THE DESTINATION ADDRESS OF THE ORIGINAL COMMUNICATION, THE TYPE OF TRANSLATION TO BE PERFORMED ON THE ORIGINAL COMMUNICATION, THE LANGUAGE OF THE COMMUNICATION TO BE TRANSLATED, & THE LANGUAGE WHICH THE COMMUNICATION IS TO BE TRANSLATED INTO)

242 ----- DISPATCHING TO THE TRANSLATION SITE DESIGNATED BY THE TRANSLATION ADDRESS VIA THE COMMUNICATIONS NETWORK THE AT LEAST ONE TRANSLATION PARAMETER

244 ----- ASSIGNING A CHARACTER STRING TO THE AT LEAST ONE TRANSLATION PARAMETER AT THE TRANSLATION SITE AND RETURN THE CHARACTER STRING TO THE ORIGINATION SITE

246 ----- ASSOCIATING THE CHARACTER STRING WITH THE ORIGINAL COMMUNICATION AT THE ORIGINATION SITE SO THE ORIGINAL COMMUNICATION AND THE CHARACTER STRING CAN BE CONVEYED TOGETHER ON THE COMMUNICATION NETWORK

206 ----- DISPATCHING THE COMMUNICATION VIA THE COMMUNICATIONS NETWORK TO ARRIVE AT A TRANSLATION SITE DESIGNATED BY THE TRANSLATION ADDRESS

208 ----- RECEIVING THE COMMUNICATION AT THE TRANSLATION SITE

248 ----- PERFORMING A TRANSLATION ON AT LEAST A PORTION OF THE ORIGINAL COMMUNICATION FROM THE FIRST LANGUAGE INTO AT LEAST THE SECOND LANGUAGE TO GENERATE A PRIMARY TRANSLATED COMMUNICATION IN ACCORDANCE WITH AT LEAST ONE TRANSLATION PARAMETER

236 ----- PERFORMING A SPELLING CHECK AND GRAMMAR CHECK ON THE TRANSLATION OF THE COMMUNICATION

250 ----- DISPATCHING THE TRANSLATED COMMUNICATION TO THE DESTINATION SITE

214 ----- RECEIVING THE TRANSLATED COMMUNICATION AT THE SITE DESIGNATED BY THE DESTINATION FIELD

216 ----- REPRODUCING IN A HUMANLY PERCEPTIBLE MANNER THE TRANSLATED COMMUNICATION SUCH THAT AN INTENDED RECIPIENT CAN COMPREHEND THE CONTENTS OF THE TRANSLATED COMMUNICATION

SYSTEM AND METHOD FOR TRANSPARENT TRANSLATION OF ELECTRONICALLY TRANSMITTED MESSAGES

BACKGROUND

1. The Field of the Invention

This invention relates to systems and methods for automatically translating messages from a first language to one or more different languages. More particularly, the present invention provides a system and method for translating messages transmitted via a computer network which is transparent to both the sender and recipient of the message.

2. The Background Art

Modern communications techniques now allow persons to convey information across the street or across the world nearly instantaneously. With land-based and wireless communication systems in place, real time communications can be transmitted from one location to another location almost anywhere in the world. Members of modern industrialized societies have come to expect instantaneous global communication of video, audio, and textual information from one location to another location.

With the widespread availability of worldwide communications it is possible to convey a communication across the globe in seconds but if the recipient does not understand the language of the communication, the recipient will likely not understand the communication for a period of time until the recipient obtains a translation thereof. Thus, the speed at which communications travel the globe is rendered ineffective by the differences in languages found throughout the world.

Importantly, the high cost and inconvenience of obtaining a translation may hinder the recipient of a message from obtaining a translation. In some cases, the recipient may even ignore a communication if in an unfamiliar language, even if the communication is important or one which will benefit the recipient. In such a situation, the sender or originator of the communication is also harmed since the sender is not provided any assurance that the recipient understands the communication once it is received. Moreover, due to political and legal requirements, some senders may be compelled to utilize a language which may not be understood by one or more recipients of a communication.

Under present circumstances, if a sender of a communication wishes to ensure that the recipient of a communication will understand the communication, the sender must ascertain the language or languages understood by the recipient or recipients, obtain translation(s) of the communication, and dispatch the translated communication (s) to the proper recipients. While all senders will find such tasks daunting, in the case of a communication which is to be dispatched to many recipients, each of whom understands a different language, the sender is faced with an unsettling task of obtaining numerous different translations and then dispatching the translated communications to the proper recipients.

As barriers to commerce erode, more people find a need or desire to communicate in a language other than their own. Such communications may be conveyed in text messages, in audio messages, or in audio/textual messages embedded in video messages. Business people, students, scientists, and all other members of a modern industrialized society can benefit from access to easy and convenient translation of their electronically transmitted communications.

OBJECTS AND BRIEF SUMMARY OF THE INVENTION

In view of the above described state of the art, the present invention seeks to realize the following objects and advantages.

It is a primary object of the present invention to provide transparent translation of electronically transmitted messages.

It is another object of the present invention to provide a system and method for translating a communication transmitted via a computer network by a sender from a first language understood by the sender to a second language understood by a recipient and deliver the translated communication to the recipient.

It is a firther object of the present invention to provide a system and method for automatic translation and delivery of communications from a first language at an origination site to a second language at a reception site with the sender only having to properly address the communication.

It is another object of the present invention to provide translation of electronically transmitted messages directed to one or more recipients which is undeleted by the recipients.

It is a still further object of the present invention to provide a system and method for translating and delivering textual messages from a sender and conveyed via a global computer network to a recipient in a language understood by the recipient and without any intervention on the part of the recipient.

It is also an object of the present invention to provide a system and method for translating electronically transmitted communications which is quick, efficient, convenient for both the sender and the recipient of such communications.

These and other objects and advantages of the invention will become more fully apparent from the description and claims which follow, or may be learned by the practice of the invention.

The present invention provides a system and method for translating a communication which is transmitted via a computer network with the communication being dispatched in a first humanly perceptible language and arriving at its destination in a second humanly perceptibly language. The communication preferably begins at an originating site and is intended to be conveyed to a destination site. The location of the destination site on the network is designated by an address, the address preferably including at least a first level domain field, a second level domain field, and a username field, as is commonly used in the Internet Protocol.

In accordance with one aspect of the present invention, the user prepares an original communication for electronic transmission on the computer network using a means for preparing an original communication. Such means for preparing can be an input/output device connected to a computer as known in the industry.

In accordance with one aspect of the present invention a destination address is provided for the original communication including a first level domain field, a second level domain field, and a username field. It is preferred that the destination address complies with the Internet Protocol and other well-known standards in the industry. In one preferred embodiment of the present invention, a translation address is concatenated onto the destination address so that the communication is delivered to a translation site before being delivered to the destination site. The translation address includes a first level domain field and a second level domain field and the concatenation is carried out such that the destination address first level domain field becomes a third level domain field and the second level domain field becomes a fourth level domain field and the username field is retained. It will be appreciated that those skilled in the art can readily arrive at devices functioning as means for providing a destination address and means for concatenating a translation address onto the destination address.

The communication is dispatched via the communications network to arrive at a translation site designated by the translation address and is received at the translation site. The computer network is preferably the global computer network known as the Internet, or some other network complying with the Internet Protocol, but can also be advantageously used with other computer networks. Electronic mail communications particularly benefit from the present invention.

At the translation site at least a portion of the communication is translated from the first language into at least the second language to generate a translated communication. Computing equipment known in the industry can function as a means for translating, or a translation machine, in accordance with the present invention. In some embodiments of the present invention, the translation address is removed from the destination address such that the destination address first level domain field is restored to the first level domain field and the second level domain field is restored to the second level domain field and the username field is retained.

As part of the method of translation, it is preferred to provide one or more of the following features: determining the type of translation which should be carried out on the original communication; the type of translation being selected from the group consisting of legal, medical, technical/engineering, or general types of translation; identifying the language of the original communication to be translated; determining the language which the communication is to be translated into; performing a machine translation on at least a portion of the communication from the first language into at least the second language to generate a primary translated communication; performing a human translation of the primary translation to generate a secondary translation; and/or performing a spelling check and grammar check on the translation of the communication.

After translation, the translated communication is conveyed via the computer network to arrive at the site designated by the destination address where it is received and reproduced in a humanly perceptible manner such that an intended recipient can comprehend the contents of the translated communication.

In accordance with another aspect of the present invention, a method is provided for conveying an electronic communication from a sender authoring the communication in a first language to a recipient understanding a second language wherein an original communication is prepared, a recipient address for the original communication is provided, and at least one translation parameter to be applied to the original communication is determined. It is preferred that a user interface at the origination site provide a dialog with the sender to determine one or more translation parameters, such as the destination address, the type of translation to be carried out, whether a copy of the translation is to be returned to the sender, and so forth.

The translation parameter(s) are dispatched to a translation site designated by a translation address via the communications network. A value, preferably represented as a unique character string, is associated with the translation parameter(s) at the translation site and returned to the origination site to identify the translation job. The original communication is then dispatched from the origination site to the translation site designated by the translation address via the communications network.

At the translation site the original communication is associated with the character string so that translation is carried out in accordance with the translation parameter(s). The translated communication is dispatched via the computer network to arrive at the site designated by the destination address where it is received and reproduced in a humanly perceptible manner such that an intended recipient can comprehend the contents of the translated communication.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3D is a chart showing the preferred steps carried out by a second preferred embodiment of the present invention.

DETAILED DESCRIPTION OF THE PREFERRED EMBODIMENTS

Reference will now be made to the drawings wherein like structures will be provided with like reference designations.

Figure 1A:
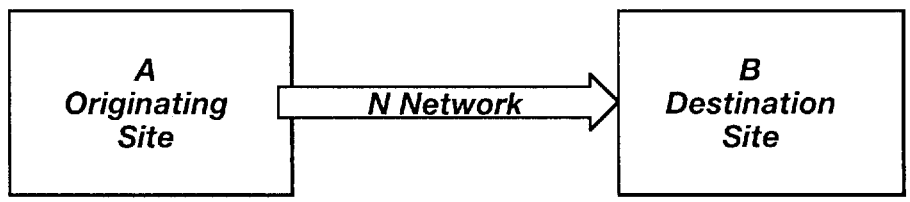
FIGS. 1A and 1B are block diagrams representing routes taken by electronically transmitted communications.

FIG. 1A is a block diagram representing an electronically transmitted communication being transmitted which includes digital data embodying the communication. The communication is prepared at an originating site, represented at A, and that data is transmitted via a network, represented at N, to a destination site, represented at B. The data which is transmitted via the network can desirably represent textual information, audio information, video information, or any combination of the three types of information. Moreover, those skilled in the art can use the information contained herein to utilize the teachings of the present invention in connection with other applications which are now available or become available in the future.

Figure 1B:
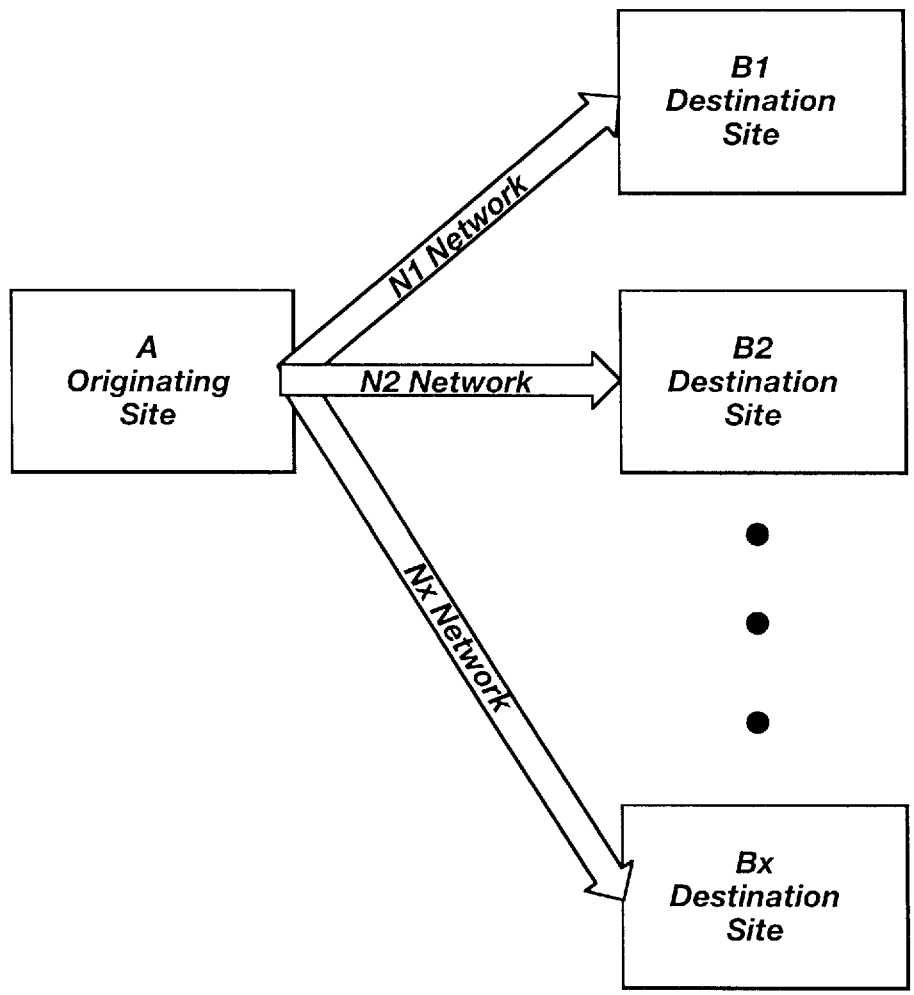

FIG. 1B is another block diagram representing another electronically transmitted communication being conveyed where digital data embodying a communication is prepared at the originating site A and that data is transmitted via different paths in a network, represented at $N_1$, $N_2$, $N_x$, to respective destination sites, represented at $B_1$, $B_2$, $B_x$. It will be appreciated that the present invention has application with many different kinds, types, and configurations of networks which are used to convey digital data. For example, the network may be a local area network (LAN), a wide area network (WAN), or another type of network which is capable of conveying digital data from an originating site to a destination site, or destination sites.

As used herein, a network is a group of computers that are able to communicate with one another, sharing data, files, programs, and/or other types of operations. The computers or machines which are connected as a network are linked via hardware and software. The hardware physically connects the computers in the network together, whether via land based cables or via wireless systems. For example: telephone lines, fiber-optic cables, routers, gateways, and the computers themselves comprise the hardware of a network. Software running on the hardware allows for communication and exchanging information. After considering the information set forth herein, those skilled in the art will appreciate the hardware and software which is preferred for embodying the present invention. As understood by those skilled in the art, a network, when operational, is able to communicate and exchange information because the computing equipment uses software that observes the same set of rules, or protocol, for communications.

Most advantageously, the present invention has particular advantage for use with the global computer network known as the Internet. While the present invention is particularly advantageous for use with the Internet, the present invention also has application with other digital data networks with equivalent functions. For example, computer networks now known as intranets can greatly benefit from the present invention. Further information regarding intranets can be obtained from the publication BUILDING AN INTRANET: A HANDS-ON GUIDE TO SETTING UP AN INTERNAL WEB by Tim Evans (Sams.net Publishing 1996) which is now incorporated herein by reference (including any machine readable material) in its entirety. Still, the presently preferred embodiments of the present invention will be described herein as they are applied to the Internet with the understanding that the teachings set forth herein can be applied to many different situations.

As known in the industry, the Internet is a decentralized global computer network comprising a multitude of computers and data conveyance lines spread throughout the world. Often referred to as a "network of networks," the Internet is a group of computer networks that are interconnected physically, capable of communicating and sharing data with each other able to act together as a single network. For the Internet to work, the networks and machines that are part of the Internet have to agree either to speak the same "language" when they are communicating or to use an "interpreter." This "language" is provided by software that enables the different types of machines on the network to communicate and exchange information. The Internet currently uses the TCP/IP protocol. Alternatively, machines which interact with TCP/IP networks via gateways do so through an interpreter. The Internet presents all the networks connected to it as one, seamless network for its users. The Internet covers the globe and includes large, international networks as well as many smaller, local-area networks (LANs). The Internet offers access to data, graphics, sound, software, text, and people through a variety of services and tools for communication and data exchange, including, for example: remote login (Telnet); file transfer (via the File Transfer Protocol "ftp"); electronic mail (e-mail); news (USENET or network news); and hypertext (via the World Wide Web "www").

In order to direct data back and forth on the Internet, the Internet protocol (CIP) is used. Addresses and domain names as well as electronic mail addresses on the Internet follow such a protocol and will be discussed herein to allow one of skill in the art to use such teachings to implement different embodiments of the present invention.

Generally, Internet addressing is a systematic way to identify people, computers and Internet resources. As used in the industry, the term "Internet address" is used loosely and can mean many different things. For example, the term Internet address may refer to an electronic mail address or refer to a Universal Resource Locator ("URL").

An IP address is a unique number that identifies computers on the Internet; every computer directly connected to the Internet has one. An IP address consists of four numbers separated by periods of the form: xxx.xxx.xxx.xxx. The four numbers represent both the machine itself, or host, and the network that the host is on. The network portion of the IP address is allocated to Internet Service Providers (ISPs) by the InterNIC, under authority of the Internet Assigned Numbers Authority (IANA). ISPs then assign the host portion of the IP address to the machines on the networks that they operate. Which sections of the IP address represent the network and which sections represent the machine will depend on what "class" of IP address is assigned to a network. There are currently 5 classes of IP addresses: Class A, Class B, Class C, Class D, and Class E. Classes correspond either to the size of the network (the number of hosts that the network can support) or are reserved for specific purposes, such as multicasting and experimentation. Thus, it will be appreciated that IP addresses are each unique, no two machines can have the same IP number, IP addresses are global and standardized, and all machines connected to the Internet agree to use the same scheme for establishing an address.

Significantly, most computers on the Internet have a unique domain name. Particular computers, called domain name servers, look up the domain name and match it to the corresponding IP (numeric) address so that data can be properly routed to its destination on the Internet. The form of a domain name is: domainname.com. Domain names, being literal and nemonic, are far easier for most people to remember, use, and generally relate to than a strictly numeric IP address. Each domain name identifies one computer connected to the Internet. Thus, a user on the Internet can utilize either the strictly numeric IP address or the alpha/numeric domain name for the destination address.

As is well known in the industry, the hierarchy in domain names allows domain names to be readily understood. To read a domain name, start at the right of the domain name, with the top-level domain. Most businesses based in the United States fit in the company or commercial (.com) top domain. Educational, nonprofit, and government networks use the .edu, .org, and .gov top level domains respectively. In countries outside of the United States, the top level domain is generally a two-letter abbreviation representing the country. When reading a domain name, one dot to the left is the second-level domain name, such as anyorganization.org, anycampus.edu, and anycompany.com. The individual host names, such as info.anycompany.com, are identified by dotted names to the left of the second-level domain. Those experienced in the industry will readily understand how to construct and interpret a domain name. Under current versions of the Internet protocol, the maximum length for a domain name is 24 characters, including the period and the top-level domain, and only letters, numbers, and hyphens may be used. Further information regarding the structure of the Internet can be obtained from Network Solutions, Inc. available at http://rs.internic.net/nic-support/ as of the filing date of this application.

Desirably, an Internet electronic mail, or e-mail, address is used to identify a person (or persons) and a computer for purposes of exchanging electronic mail messages via the Internet. An example of an Internet e-mail address is:

janedoe@xyz.edu

As is understood in the industry, Internet e-mail addresses are read from left to right:

"janedoe" is the name of the person receiving or sending the message; this is referred to as the username field or the "local part" of the address.

"xyz" is the second level domain name field and part of the complete domain name of the organization.

"edu" is the first (or top) level domain name field and is also part of the organization's complete domain name and, in this case, indicates that "xyz" is an educational institution.

Generally, the portion of the address to the right of the @ symbol is referred to as the "domain part" of the address while the portion of the address to the left of the @ symbol is referred to as the "local part" of the address. Further information on e-mail conventions, protocols, and standards can be obtained from the publication THE E-MAIL COMPANION: COMMUNICATE EFFECTIVELY VIA THE INTERNET AND OTHER GLOBAL NETWORKS by John S. Quarterman & Smot Carl-Meitchell (Addison-Wesley Publishing Company 1994) which is now incorporated herein by reference (including any machine readable material) in its entirety. As is known in the industry, communications transmitted via the Internet in accordance with the present invention preferably comply with the MIME (Multipurpose Internet Mail Extensions) standard.

Other networks may use different electronic mail addressing schemes within their own networks. To be used in Internet e-mail, these addresses often need to be modified. For example, within the COMPUSERVE® online service an e-mail address consists only of two numbers separated by a comma:

36547,891

To convert this to an address that can be used on the Internet, the comma is changed to a period and the number serves as the username. The domain name is compuserve.com, so the Internet address would be:

36547.891@compuserve.com

It is to be understood that other conversions may also occur within the scope of the present invention.

On the Internet, URL stands for Uniform Resource Locator. URLs are used to identify specific sites and files available on the World Wide Web. The structure of a URL is:

protocol://server.subdomain.top-level-domain/directory/filename

Not all URLs will have the directory and filename as shown in the following two examples:

http://www.anycompany.com/anyproduct/favoriteproduct.html gopher://gopher.stateu.edu/

Thus, Internet addressing is used to identify people, computers, and Internet resources.

From the foregoing, it will be understood that the Internet uses a particular nomenclature to determine where to send a communication starting at an originating site (A in FIGS. 1A & 1B) to arrive at a destination site (B, $B_1$, $B_2$, or $B_x$, in FIGS. 1A & 1B). As explained above, the domain name system (DNS) is used to direct data on the Internet in a manner which is analogous to a street addressing system.

As explained earlier, as infrastructure barriers to global communication and business transactions have diminished, differences in language have still remained as a barrier. The difficulty and time required to obtain translations of a communication is the anthesis of instantaneous electronic communications. Users of e-mail seek immediate conveyance of their message whenever they spontaneously decide that communication is necessary or desirable. Thus, stopping to obtain a translation of a message before transmitting the message is contrary to spontaneity of e-mail. Moreover, someone sending e-mail cannot effectively provide fluent translations from one language into any one of a potential multitude of different languages which may be understood by the recipients of the message. Still further, one e-mail message may be designated for many different recipients, each of whom understands a different language. For these reasons, it is unrealistic for the sender/originator of the message to have the ability to translate the message into all possible numerous different languages, and particularly to do so efficiently, while the present invention provides these functions so efficiently.

The presently preferred embodiments of the invention provide a system and method for a sender/originator of an electronically transmitted message to merely transmit the message and a translation of the message into an appropriate language will be delivered to the addressed recipient.

Figure 3A:
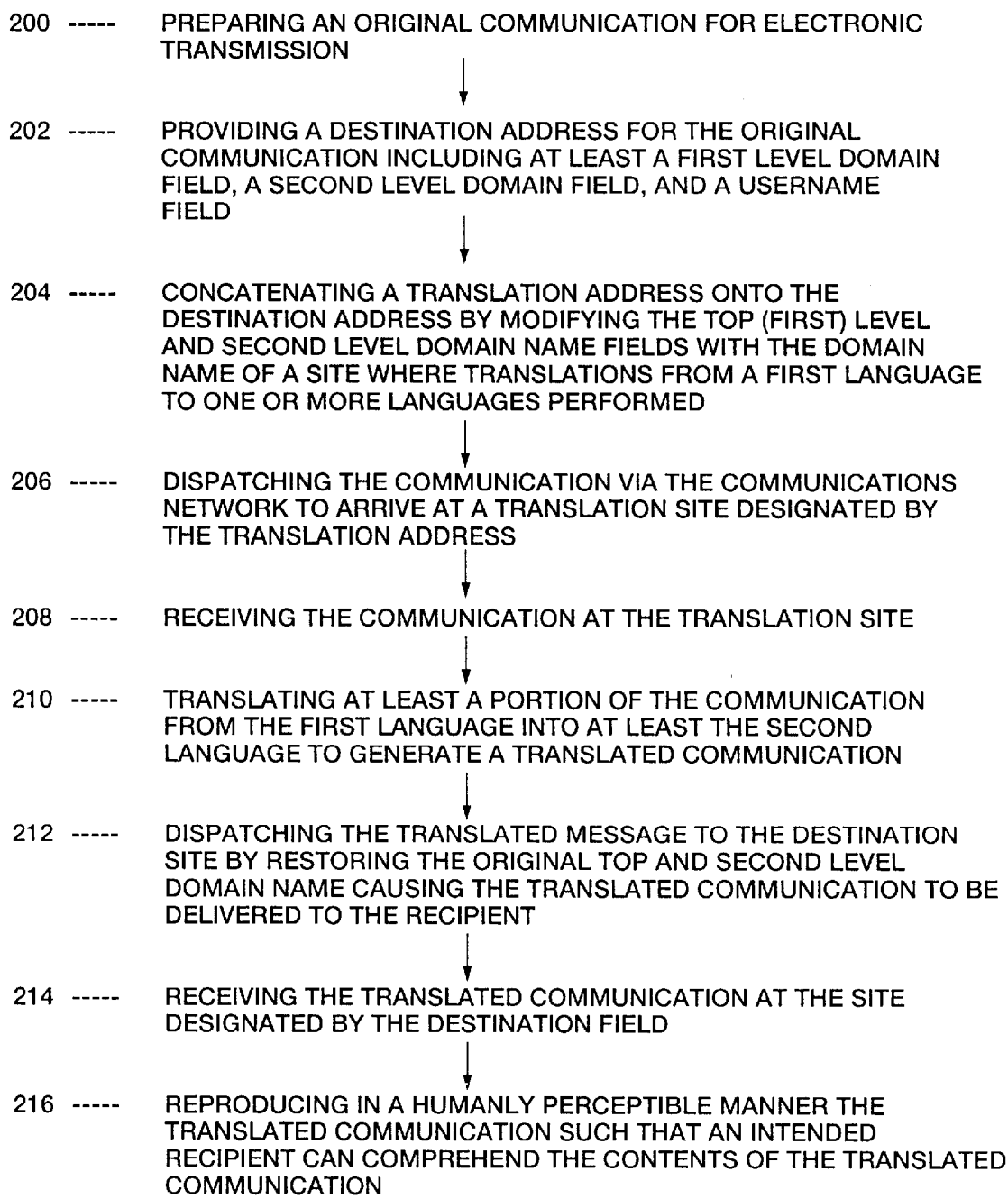
FIG. 3A is a chart showing the preferred steps carried out by the first preferred embodiment of the present invention.

In this first preferred example of the invention, an explanation will be provided using an e-mail message to be sent from a first person to a second person. In this example, a message is to be sent from ussender@uscompany.com to frrecipient@frcompany.com with the person having the e-mail address ussender@uscompany.com only speaking English with the person having the e-mail address frrecipient@frcompany.com only understanding French. As represented in the chart of FIG. 3A, the sender prepares an original communication for electronic transmission (Step 200). A destination address for the original communication (including at least a first level domain field, a second level domain field, and a username field) is associated with the communication (Step 202 in FIG. 3A).

Figure 2A:
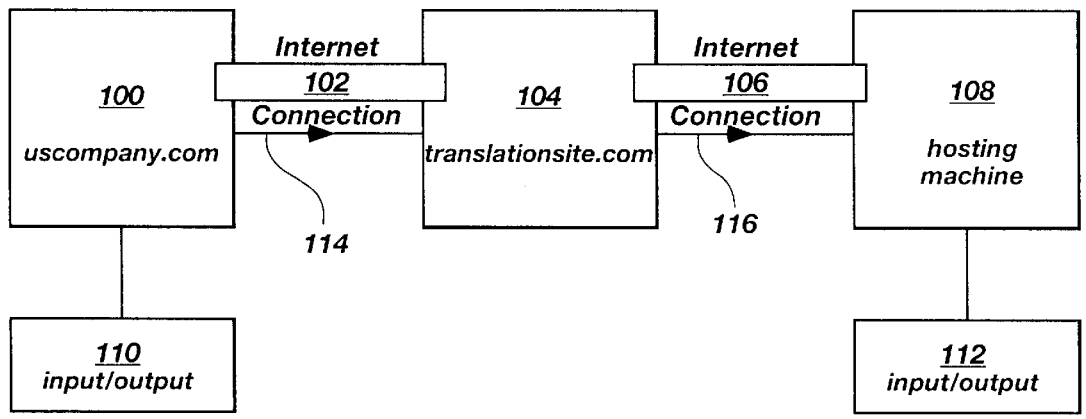
FIG. 2A is a block diagram showing a first preferred embodiment of the present invention.

In FIG. 2A the machine connected to the Internet which is assigned the domain name uscompany.com is represented at 100. An input/output device attached to the machine 100 is represented at 110. The input/output device 110 is an example of one structure which the sender may use to prepare a communication for electronic communication. The machine connected to the Internet which is assigned the domain name frcompany.com is represented at 108. An input/output device is also attached to the machine 108 and is represented at 112. To use the present invention, the sender modifies the top (first) level and second level domain name fields with the domain name of a site where translations from a first language to one or more languages are efficiently and quickly performed. In the this first example of the present invention, the destination e-mail address is modified as follows:

frrecipient@frcompany.com to frrecipient@frcompany.com.translationsite.com where translationsite.com is the domain name which identifies an Internet site where centralized translation occurs in accordance with the present invention. As represented in FIG. 3A at step 204, a translation address is concatenated onto the destination address by modifying the top (first) level and second level domain name fields with the domain name of a site where translations are performed. The communication is then dispatched via the Internet to arrive at a translation site designated by the translation address (Step 206 in FIG. 3A) and received by the translation site (Step 208 in FIG. 3A).

In FIG. 2A the machine connected to the Internet which is assigned the domain name translationsite.com is represented at 104. The Internet connections between the machines 100, 104, and 108 are represented (greatly simplified) at 102 and 106. Providing centralized translation is much more efficient than distributing the translation processes throughout all of the potential senders of messages on the Internet. Additional information on the translation which occurs at the translation site will be provided shortly.

Once translation of the message occurs (Step 210 in FIG. 3A), the translated message is dispatched (Step 212 in FIG. 3A) to the destination site by restoring the original top and second level domain name as follows:

frrecipient@frcompany.com.translationsite.com to frrecipient@frcompany.com which causes the translated message to be delivered to the person having the username frrecipient at the domain name frcompany.com. The translated message is received at the site designated by the destination field (Step 214 in FIG. 3A) and is then reproduced in a humanly perceptible manner such that an intended recipient can comprehend the contents of the translated communication (Step 216 in FIG. 3A). For example, the input/output device 112 can be used to display the translated message to the recipient.

Figure 2B:
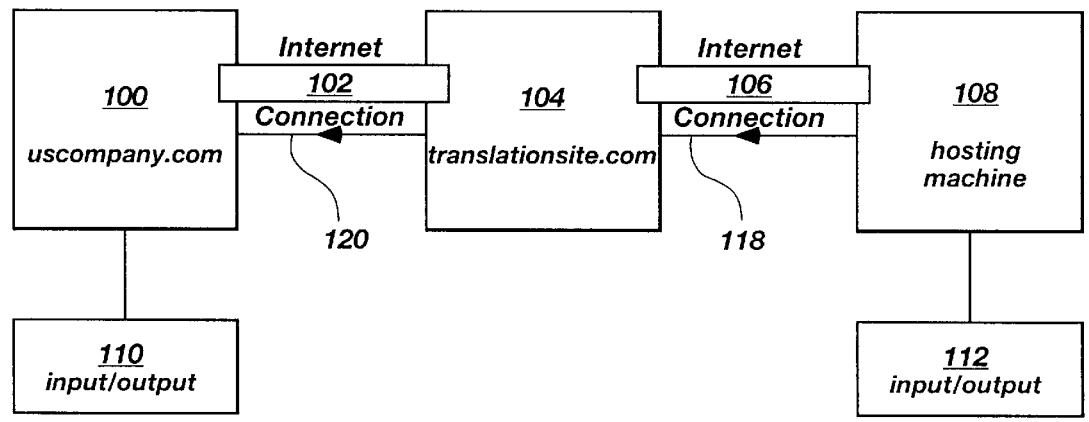
FIG. 2B is a block diagram showing a second preferred embodiment of the present invention.

In FIG. 2B, the direction which the communication flows (from machine 100 to machine 104 to machine 108) is indicated by arrows 114 and 116. It is to be appreciated that as used herein, the terms "message" and "communication" are intended to include any information which is attached to or referred to by a message or communication, such as data files often associated with an e-mail message and referred to as "attachments."

Optionally, if the sender wishes that any response from the recipient to be translated at the translation site, the sender's address which appears to the recipient will be modified to include the domain name of the translation site. Thus, in the current example the message will appear to be from:

ussender@uscompany.com.translationsite.com indicating that any response should also be directed to that address. If a response is received, the responsive message is translated and forwarded to the recipient in the manner just explained (see Step 222 in FIG. 3B).

The feature of automatically translating any response which is sent from frrecipient@frcompany.com is represented in FIG. 2B by arrows 118 and 120 showing the direction which any responsive communication flows from machine 108 to machine 104 to machine 100. It is also within the scope of the present invention for a sender of a message to instruct the translation site (translationsite.com in this first example) via an entry in the subdomain field indicating that any response should be translated and conveyed to the ussender@uscompany.com. For example, insertion of a subdomain such as:

frrecipient@frcompany.com.txresponse.translationsite.com where the insertion of the subdomain txresponse indicates to the translation site that any response should also be translated and conveyed. It will be appreciated that the technique of adding information, for example referred to as an "instruction field," to the left or the right of the top and second level domains can be used to convey instructions to the translation site within the scope of the present invention.

It will be appreciated that, for purposes of clarity, FIGS. 2A and 2B greatly simplify the path(s) which communications take on the Internet, as well as the path(s) taken on other applicable networks. For further information on conveyance of information on the Internet, see the publication SERVING THE WEB: EVERYTHING YOU NEED TO SET UP AND RUN YOUR OWN WEB SERVER by Robert Jon Mudry (Coriolos Group Books 1995) which is now incorporated herein by reference (including any machine readable material) in its entirety. Moreover, those skilled in the art will readily be able to arrive at the programming code needed to provide the above described functions to the sender of the message, particularly by including such features in software presently available and known as a "web browser" or as "E-mail software."

Importantly, with the present invention the process of translation is transparent to the recipient of the communication. That is, the recipient is unaware from the message itself that the sender did not originate it in the language in which the recipient received it. Providing such transparent translation is important to many senders of messages to facilitate free communication in their language of choice. A recipient may be less likely to respond to a communication if the recipient knows that the sender must have the response translated or the recipient may be inhibited from responding in the recipient's preferred language. Thus, the transparent translation of messages, particularly electronically transmitted messages, provides great advantages not available prior to the present invention.

Figure 2C:
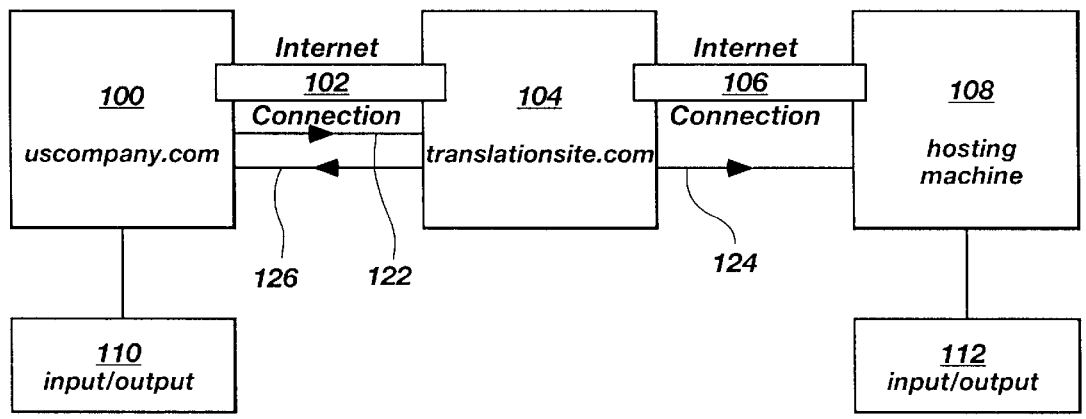
FIG. 2C is a block diagram showing a third preferred embodiment of the present invention.

Reference will next be made to FIG. 2C to describe an additional feature of the present invention. FIG. 2C shows machine 100, machine 104, and machine 108 where a message is conveyed to the translation site hosted by machine 104, as represented by arrow 122, with the translation of the message being conveyed to the machine 108 hosting the recipient as explained earlier, as represented by arrow 124. FIG. 2C also shows the feature of dispatching a copy (colloquially referred to as a "carbon copy") of the translated message back to the sender of the message as represented by arrow 126 (Step 224 in FIG. 3B). Using the information set forth herein, the feature of dispatching a copy of the translated message back to the sender of the message without human intervention can be readily arrived at by those skilled in the art.

Figure 2D:
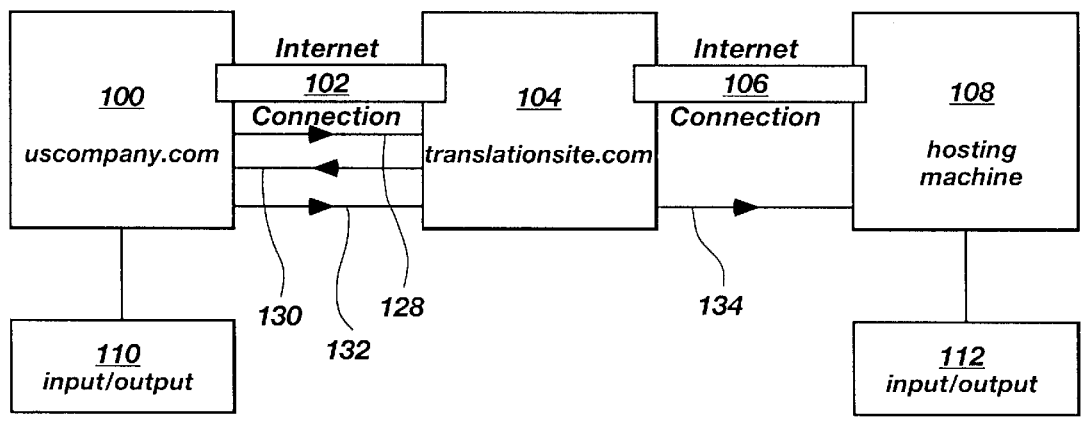
FIG. 2D is a block diagram showing a fourth preferred embodiment of the present invention.

Reference will next be made to FIG. 2D to describe an additional preferred feature of the present invention. FIG. 2D represents a message being conveyed from machine 100 to the machine 104, as represented by arrow 128, where the message undergoes translation. The translated message is then conveyed back to the machine 100, as represented by arrow 130, where the sender is allowed to confirm/modify the translation (Step 218 in FIG. 3B). The sender then coveys the translated message, with any modifications, back to machine 104 as represented by arrow 132. The translation site then performs any further processing on the message and conveys the translated/modified message to the machine 108 hosting the recipient as represented by arrow 134. Using the information set forth herein, the feature of obtaining confirmation/modification of the translated message by the sender can be readily arrived at by those skilled in the art.

As indicated earlier, the processing which occurs at the translation site will now be further explained. Once the message has arrived at the translation site, it can preferably undergo one or more processing steps. It is to be understood that the present invention may involve using all of the processing steps described herein or only some of the processing steps described herein, in accordance with the circumstances under which the present invention is to be applied.

Figure 2E:
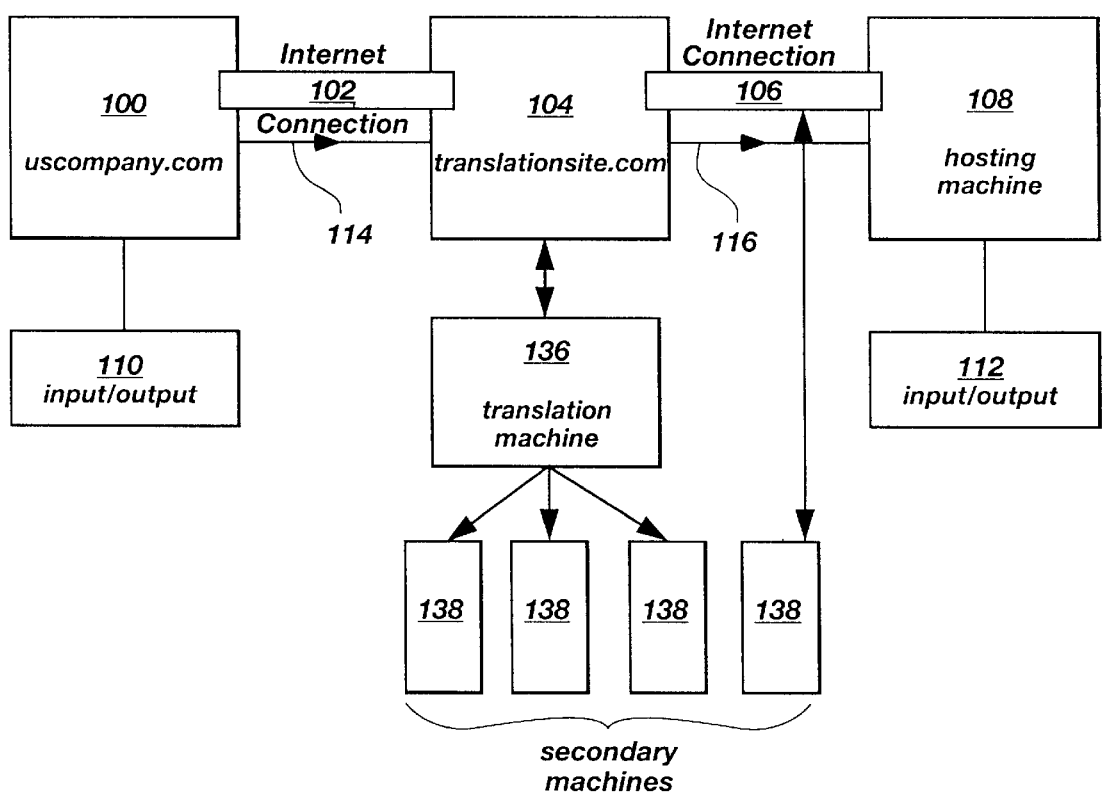
FIG. 2E is a block diagram showing a fifth preferred embodiment of the present invention.

Referring to FIG. 2E, the machine 104 which is host to the translation site has associated with it various additional structures and devices. While the various additional structures and devices are represented in the figures as separate blocks, it will be understood that such structures and devices can all be combined into a single machine, for example the machine 104, or may be spread among many different discrete machines. Moreover, it will be understood that as used herein the term "translation site" merely refers to the characteristic that communications which are to be processed are conveyed through the machine 104 having the designated domain name/IP address. Thus, the translation functions discussed herein may be carried out in close physical proximity to the machine 104 or may merely be in communication with the translation machine but physically separated by a large distance. Moreover, the communication between machines may occur in real time or it is within the scope of the present invention to provide that the communication occur in any machine readable batch form.

In communication with the machine 104 is a translation machine 136. The translation machine 136 can be any processing device which is capable of generating a translation from one language to a different language (Step 232 in FIG. 3C). Those skilled in the art can readily arrive at the hardware and software necessary to carry out translation using the systems available in the industry or using other systems which can be devised. The translation machine is one preferred example of a means for translating and all structures providing the same or similar functions are intended to fall within the scope of the means for translating. The means for translating carries out a translation of the message received by the machine 104.

Figure 3B:
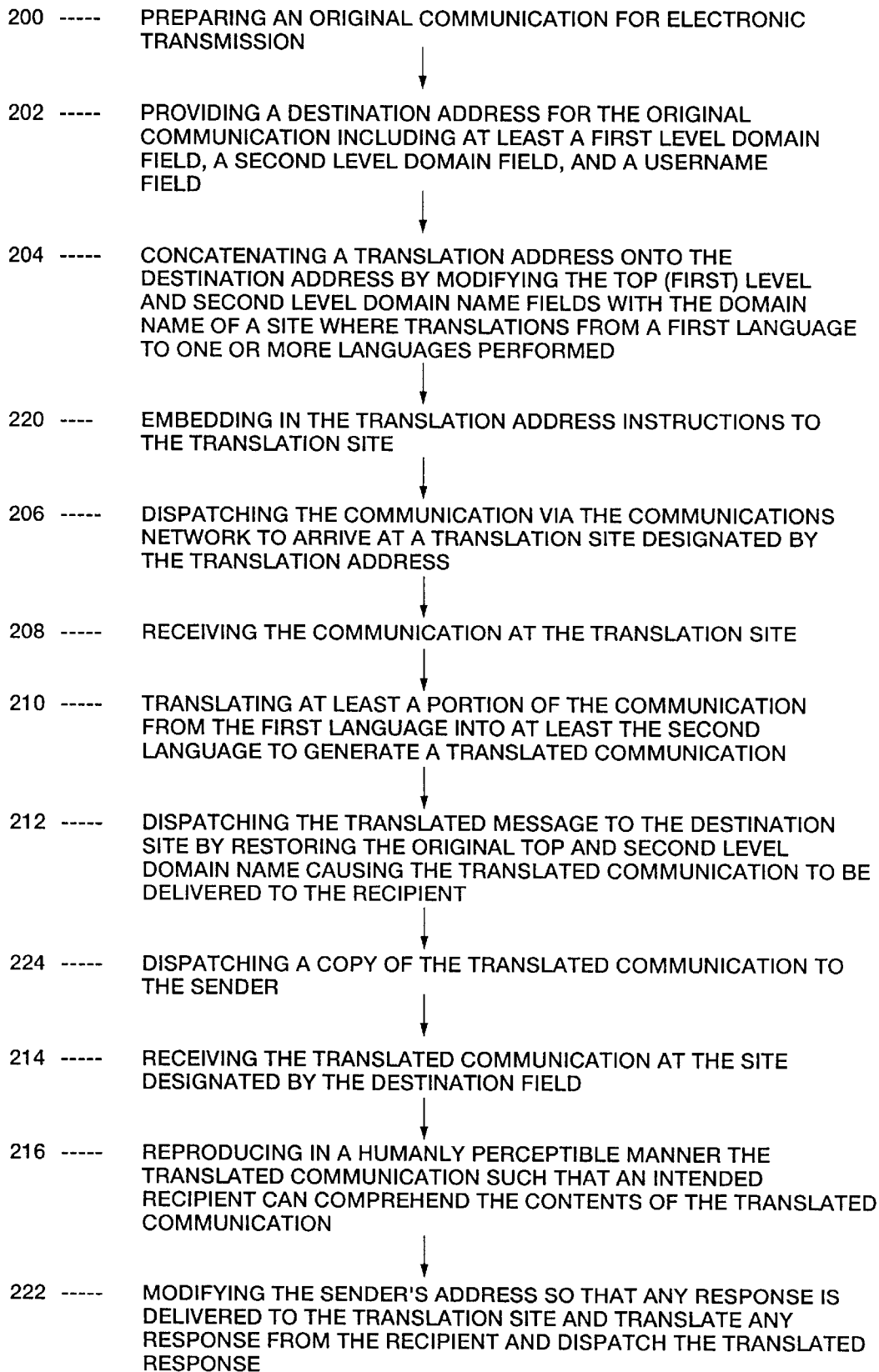
FIG. 3B is a chart showing additional preferred steps carried out by some embodiments of the present invention.
Figure 3C:
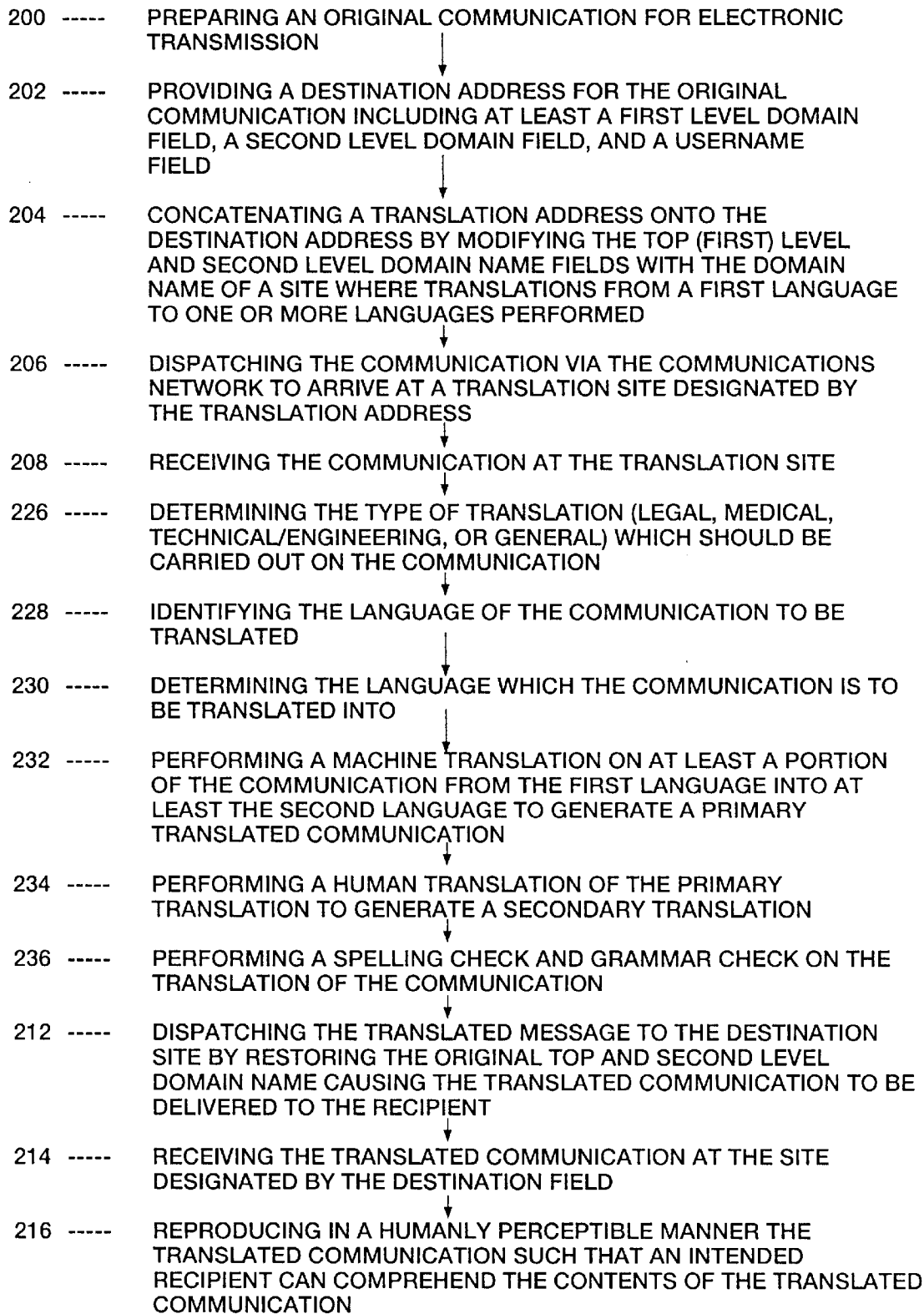
FIG. 3C is a chart showing additional preferred steps carried out by some embodiments of the present invention.

In accordance with the present invention, the translation machine identifies the language of the message to be translated (Step 228 in FIG. 3C). Either available techniques or readily arrived at techniques can be used to identify the language of the message. It is also within the scope of the present invention to identify the subject matter of the translation and to choose the type of appropriate translation which is to be carried out on the message (Step 226 in FIG. 3C). For example, some messages pertaining to particular subject matter, such as legal messages, medical messages, technical/engineering messages, can preferably be processed separately from messages of a general subject matter and treated with particular attention. Thus, the translation machine can preferably determine the type of translation which should be carried out: legal, medical, technical/engineering, or general.

It is also preferred that the translation machine 136 determine the language which the message is to be translated into (Step 230 in FIG. 3C). It is within the scope of the present invention for the sender of the message to indicate the language into which the message is to be translated, either within the e-mail address or otherwise. It is also beneficially preferred that the present invention determine the language into which the message is to be translated by noting the top level domain. As known in the industry, the top level domains .com, .edu, .org, and .gov are generally used for entities based in the United States. Organizations based outside of the United States are often assigned two letter top level domains which indicate the country. A list of two letter domains is available at 206.3.148.4/files/domain.html which, as it exists as of the filing date of this application, is now incorporated herein by reference in its entirety. In some preferred embodiments of the present invention, the translation machine 136 determines the country which is the destination of the translated message by the two letter country indicating top level domain and performs a translation into a preselected language in accordance with the top level domain.

It is also preferred that the translation machine 136 perform spelling checks and grammar checks on the translated message (Step 236 in FIG. 3C). It is also preferred that the present invention include the steps of: removing portions of the message which are not translatable prior to translation (for example, proper nouns, figures, dates, and so forth) and inserting the not translatable portions back into the translated message before dispatching the translated message to its destination; removing confidential portions of the message prior to translation and inserting the confidential portions back into the translated message before dispatching the translated message to its destination; and, determining the amount which the customer, generally the sender of the message, is to be charged for the service and bill the customer accordingly, via fax, mail, e-mail, or some other method which can be selected by those skilled in the art.

It is also within the scope of the present invention to complement the translation performed by the translation machine with a translation performed by one or more human translators (Step 234 in FIG. 3C). Thus, in some preferred embodiments of the present invention a human translator reviews the machine translation performed by the translation machine. In other preferred embodiments of the present invention, a human translator will perform all of the translation of the message.

In instances where the present invention utilizes one or more human translators, additional translation machines are preferably provided. As represented in FIG. 2E, secondary translation machines 138 are preferably provided. The secondary translation machines 138 can be connected to the translation machine 136 via any communication link which is available in the industry and which can be selected by those skilled in the art. The secondary translation machines 138 can be located in close physical proximity to the translation machine 136 or may be located a distance from the translation machine. For example, one secondary translation machine 138 communicates with the translation machine 136 via an Internet connection represented at 106. Each of the secondary translation machines 138 is provided with user interface devices so that, in addition to further machine translation which each secondary translation machine 138 performs, a human translator can perform translations or edit machine translations using the secondary translation machine 138. Thus, it is within the scope of the present invention to perform a primary machine translation on a message, convey the machine translation of the message to a human translator, perform a secondary translation on the message by the human translator, and convey the secondary translation to the destination of the message. Desirably, performing the secondary translation on the message by a human translator can occur in close physical proximity to the translation machine 136 or can occur at physical locations which are distant from the translation machine 136, all of which are referred to herein as a translation site.

Figure 2F:
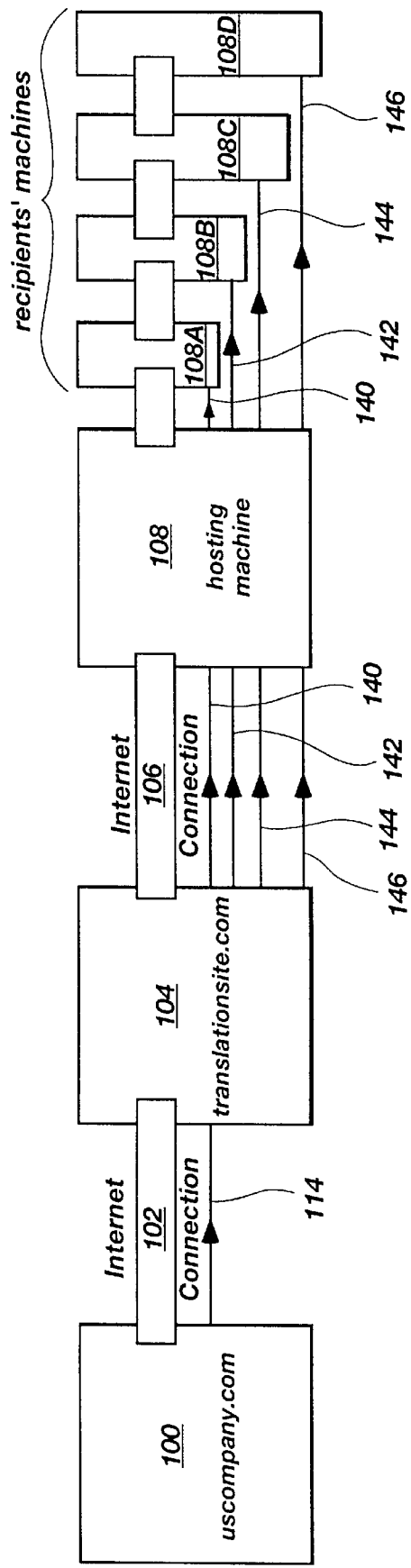
FIG. 2F is a block diagram showing an application of an embodiment of the present invention.

Reference will next be made to FIG. 2F to describe an additional preferred embodiment of the present invention. FIG. 2F represents a message being conveyed from the machine 100 to the machine 104 where the message undergoes translation into four different languages, as represented by arrows 140, 142, 144, and 146 with the resulting four translated messages being conveyed to the machine 108 hosting the recipients, with each translated message being conveyed to the proper recipient's machines, which are represented at 108A–D. It will be appreciated that the recipients of the different translated messages can be located large distances apart and at different sites on the Internet.

Reference will now be made to FIG. 3D to describe a further presently preferred example of the present invention. It will be appreciated that many of the attributes already explained above also apply to this further example of the present invention. Thus, only the significantly different aspects of this further example of the present invention will be described in detail with the understanding that those skilled in the art can utilize the previously described attributes of the present invention in conjunction with those attributes which will now be described.

Represented in FIG. 3D, and as represented in FIGS. 3A–3C, step 200 indicates that an original communication for electronic transmission is prepared at an origination site and step 202 indicates that a destination address for the original communication is provided, the destination address having a first level domain field, a second level domain field, and a username field, as previously described.

To provide the user at the origination site even greater efficiency and ease of use of the present invention, a user interface at the origination site is provided in this further exemplary embodiment represented in FIG. 3D. The user interface prompts the user to enter information about the translation to be performed. The user interface can desirably provide a dialog with the user, for example via the input/output device 110 (FIG. 2A) which the user operates to send messages via the machine 100 (FIG. 2A) and the Internet.

The user interface provided in this example of the present invention determines from the user at least one translation parameter which is to be applied to the original communication (Step 240). Included among the preferred translation parameters are: the destination address of the original communication; the type of translation to be performed on the original communication; the language of the communication to be translated; the language which the communication is to be translated into; whether a copy of the translation should be dispatched back to the sender for confirmation and/or modification; whether a copy of the final translated communication should be dispatched to the sender; and any other instruction regarding the translation which is desired.

The user interface can preferably be implemented using programming code which those skilled in the art can arrive at using the information set forth herein. For example, it is within the scope of the present invention to provide a web browser with the necessary programming code to provide the preferred user interface. In the case of a web browser, programming code referred to as a plug-in which provides additional features and functionality to the web browser can be used to allow the user to conveniently and efficiently provide the translation parameters. Information on creation and use of web browser plug-ins can be obtained from PROGRAMMING NETSCAPE PLUG-INS by Zan Oliphant (Sams.net Publishing 1996) which is now incorporated herein by reference (including any machine readable material) in its entirety. Alternatively, the user interface can be implemented using a programming language such as JAVA, which is a platform independent programming language which is particularly useful for carrying out tasks on the Internet. Information on JAVA programming can be obtained from JAVA PROGRAMMING FOR THE INTERNET by Michael D. Thomas, Pratik R. Patel, Alan D. Hudson, & Donald A. Ball, Jr. (Ventana Communications Group, Inc. 1996) which is now incorporated herein by reference (including any machine readable material) in its entirety. Still further, the programming code for the user interface can be created as a stand-alone program in accordance with the appropriate Internet protocols. An example of the form of the parameters which the user's web browser may convey to the translation site is as follows:

---
destination_address: frrecipient@frcompany.com
sender_address: ussender@uscompany.com
type_of_translation: medical
original_language: english
translated_language: french
carbon_copy: yes
---

Once the user has input appropriate translation parameters, the translation parameters are dispatched to the translation site designated by the translation address via the Internet (Step 242 in FIG. 3D). As part of the dispatching and reception of the translation parameters via the Internet, a character string is assigned to the translation parameters at the translation site and conveyed by to the origination site so that the character string is available at the origination site (Step 244). The character string can preferably be a numeric or alpha-numeric character string which is unique in order to differentiate one translation job from another translation job (even different translation jobs from the same sender to the same recipient) performed by the translation site. The character string can, if desired, be divided into fields so that certain fields represent certain translation parameters. Moreover, it is within the scope of the present invention to implement an encryption scheme to encrypt communications which are sent via the Internet. Those skilled in the art will readily be able to arrive at the necessary programming code using the information set forth herein to provide encryption of the original communication as it is conveyed from the origination site to the translation site and as the translated communication is conveyed from the translation site to the destination site. It is within the scope of the present invention to provide a browser plug-in or a JAVA applet to provide the necessary de-encryption.

Preferably, the character string is associated with the original communication at the origination site (Step 246) so the original communication and the character string are conveyed together on the Internet to the translation site. For example, the character string dispatched with the original communication may be of the form:

xxxxxxxx@translationsite.com

After the original communication is received at the translation site (104 in FIGS. 2A–F), a translation is performed on the original communication in accordance with the translation parameter(s) which were associated with the character string (Step 248) and as previously explained. Thus, if the user indicated to the user interface that the original communication should be translated into french, that the translation should be expedited, that the communication should account for medical terminology, and that a copy of the translated communication should be conveyed back to the sender, all of these parameters would be carried out in the process. After the translation process is completed, the translated communication is dispatched to the destination site (Step 250).

As will now be appreciated, the described second example of the present invention provides a system and method for obtaining translations of communications which is most convenient and efficient for a wide variety of users.

Examples of preferred languages which the present invention may be utilized to translate to or from include:

| | | |
|---|---|---|
| Belarusian (Belorussian) | German | Russian |
| Bulgarian | Italian | Serbo-Croatian |
| Czech | Japanese | Slovak |
| Chinese | Korean | Spanish |
| Danish | Norwegian | Swedish |
| Dutch | Polish | Ukrainian |
| English | Portuguese | |
| French | Romanian | |

It is to be understood that this list of languages is merely exemplary and users can benefit from the present invention even if fewer languages are accommodated as well as the present invention also providing benefits if additional languages are implemented.

From the forgoing explanation, it will be understood that the present invention can desirably provide automatic translation and forwarding of an electronically transmitted message which is processed without human intervention. Alternatively, human intervention can be inserted into the embodiments of the present invention where desirable. Using the information set forth herein, those skilled in the art will readily be able to arrive at the necessary structures to carry out the functions of the present invention.

In view of the forgoing, it will be appreciated that the present invention provides transparent translation of electronically transmitted messages and particularly provides a system and method for translating a communication transmitted via a computer network by a sender from a first language understood by the sender to a second language understood by a recipient and deliver the translated communication to the recipient.

The present invention also provides a system and method for automatic translation and delivery of communications from a first language at an origination site to second language at a reception site with the sender only having to properly address the communication and provides translation of electronically transmitted messages directed to one or more recipients which is unobserved by the recipients. The present invention also provides a system and method for translating and delivering textual messages from a sender and conveyed via a global computer network to a recipient in a language understood by the recipient and without any intervention on the part of the recipient and which is quick, efficient, and convenient for both the sender and the recipient of such messages.

The present invention may be embodied in other specific forms without departing from its spirit or essential characteristics. The described embodiments are to be considered in all respects only as illustrative and not restrictive. The scope of the invention is, therefore, indicated by the appended claim rather than by the foregoing description. All changes which come within the meaning and range of equivalency of the claims are to be embraced within their scope.

What is claimed and desired to be secured by United States Letters Patent is:

1. A method for translating, from a first humanly perceptible language to at least a second humanly perceptibly language, a communication transmitted via a computer network from an originating site to a destination site, the location of the destination site on the network being designated by at least a first level domain field, a second level domain field, and a username field, the method comprising the steps of:

preparing an original communication for electronic transmission;

providing a destination address for the original communication including a first level domain field, a second level domain field, and a username field;

concatenating a translation address onto the destination address, the translation address including a first level domain field and a second level domain field and such that the destination address first level domain field becomes a third level domain field and the second level domain field becomes a fourth level domain field and the username field is retained;

dispatching the communication via a communications network to arrive at a translation site designated by the translation address;

receiving the communication at the translation site;

translating at least a portion of the communication from the first language into at least the second language to generate a translated communication;

removing the translation address from the destination address, such that the destination address first level domain field is restored to the first level domain field and the destination address second level domain field is restored to the second level domain field and the username field is retained;

dispatching the translated communication via the computer network to arrive at the site designated by the destination address;

receiving the translated communication at the site designated by the destination address; and reproducing the translated communication in a humanly perceptible manner such that an intended recipient can comprehend the contents of the translated communication.

2. A method for translating a communication transmitted via a computer network as defined in claim 1 wherein the communication network comprises a global computer network which complies with the Internet protocol.

3. A method for translating a communication transmitted via a computer network as defined in claim 1 wherein the step of dispatching the communication via a communications network comprises the step of dispatching the original communication via a global computer network via the Internet Protocol.

4. A method for translating a communication transmitted via a computer network as defined in claim 1 wherein the step of dispatching the communication via a communications network comprises the step of dispatching the original communication via an Intranet.

5. A method for translating a communication transmitted via a computer network as defined in claim 1 wherein the step of dispatching the communication via a communications network comprises the step of dispatching the original communication via an a local area network.

6. A method for translating a communication transmitted via a computer network as defined in claim 1 wherein the step of preparing an original communication for electronic transmission comprises the step of preparing an electronic mail message in accordance with the MIME standard.

7. A method for translating a communication transmitted via a computer network as defined in claim 1 wherein the step of preparing an original communication for electronic transmission comprises the step of preparing an audio communication for transmission.

8. A method for translating a communication transmitted via a computer network as defined in claim 1 wherein the step of receiving the translated communication at the site designated by the destination field comprises the step of transparently receiving the translated communication at the site designated by the destination field such that the recipient is not aware of the translation.

9. A method for translating a communication transmitted via a computer network as defined in claim 1 wherein the step of dispatching the communication via a communications network to arrive at a translation site designated by the translation address comprises the step of dispatching the original communication via a global computer network in accordance with the Internet Protocol.

10. A method for translating a communication transmitted via a computer network as defined in claim 1 wherein the step of translating at least a portion of the original communication from the first language into at least the second language to generate a translated communication comprises the steps of:

translating at least a portion of the communication from the first language into at least the second language to generate a translated communication; and dispatching a copy of the translation back to the sender.

11. A method for translating a communication transmitted via a computer network as defined in claim 1 wherein the step of translating at least a portion of the original communication from the first language into at least the second language to generate a translated communication comprises the steps of:

determining the type of translation which should be carried out on the original communication, the type of translation being selected from the group consisting of legal, medical, technical/engineering, or general types of translation;

identifying the language of the original communication to be translated;

determining the language which the communication is to be translated into;

performing a machine translation on at least a portion of the communication from the first language into at least the second language to generate a primary translated communication;

performing a human translation of the primary translation to generate a secondary translation; and performing a spelling check and grammar check on the translation of the communication.

12. A method for translating a communication transmitted via a computer network as defined in claim 1 wherein the step of concatenating a translation address onto the destination address further comprises insertion of an instruction field into the translation address.

13. A method for translating a communication transmitted via a computer network as defined in claim 1 wherein the step of translating at least a portion of the communication comprises the step of translating an electronic mail message and any attachments to the electronic mail message.

14. A method for translating a communication transmitted via a computer network as defined in claim 1 wherein the first humanly perceptible language is a language selected from the group consisting of: Belarusian, Bulgarian, Czech, Chinese, Danish, Dutch, English, French, German, Italian, Japanese, Korean, Norwegian, Polish, Portuguese, Romanian, Russian, Serbo-Croatian, Slovak, Spanish, Swedish, and Ukrainian and wherein the second humanly perceptible language is a language selected from the group consisting of: Belarusian, Bulgarian, Czech, Chinese, Danish, Dutch, English, French, German, Italian, Japanese, Korean, Norwegian, Polish, Portuguese, Romanian, Russian, Serbo-Croatian, Slovak, Spanish, Swedish, and Ukrainian.

15. A method for conveying an electronic communication from a sender authoring the communication in a first language at an origination site such that the communication is delivered to a recipient in a second language different from the first language, the method comprising the steps of:

preparing an original communication for electronic transmission;

providing a recipient address for the original communication, the recipient address comprising a destination field;

determining at least one translation parameter to be applied to the original communication;

dispatching to a translation site designated by a translation address via the communications network the at least one translation parameter;

associating a value with the at least one translation parameter at the translation site and returning the value to the origination site;

dispatching the original communication from the origination site to the translation site designated by the translation address via the communications network;

receiving the original communication with the value associated with the original communication at the translation site;

translating at least a portion of the original communication from the first language into at least the second language to generate a translated communication in accordance with the at least one translation parameter;

dispatching the translated communication via the computer network to arrive at the site designated by the destination field;

receiving the translated communication at the site designated by the destination field; and reproducing the translated communication in a humanly perceptible manner such that an intended recipient can comprehend the contents of the translated communication.

16. A method for translating a communication transmitted via a computer network as defined in claim 15 wherein the communication network comprises a global computer network which complies with the Internet protocol.

17. A method for translating an electronic communication transmitted via a computer network as defined in claim 15 wherein the step of dispatching to the translation site comprises the step of dispatching the original communication via a global computer network in compliance with the Internet Protocol.

18. A method for translating an electronic communication transmitted via a computer network as defined in claim 15 wherein the step of dispatching to the translation site comprises the step of dispatching the original communication via an Intranet.

19. A method for translating an electronic communication transmitted via a computer network as defined in claim 15 wherein the step of dispatching to the translation site comprises the step of dispatching the original communication via an a local area network.

20. A method for translating an electronic communication transmitted via a computer network as defined in claim 15 wherein the step of preparing an original communication for electronic transmission comprises the step of preparing an electronic mail message in accordance with the MIME standard.

21. A method for translating an electronic communication transmitted via a computer network as defined in claim 15 wherein the step of preparing an original communication for electronic transmission comprises the step of preparing an audio communication for transmission.

22. A method for translating an electronic communication transmitted via a computer network as defined in claim 15 wherein the step of receiving the translated communication at the site designated by the destination field comprises the step of transparently receiving the translated communication at the site designated by the destination field such that the recipient is not aware of the translation.

23. A method for translating an electronic communication transmitted via a computer network as defined in claim 15 wherein the step dispatching the translated communication via the computer network to arrive at the site designated by the destination field comprises the step of dispatching the original communication via a global computer network in accordance with the Internet Protocol.

24. A method for translating an electronic communication transmitted via a computer network as defined in claim 15 wherein the step of translating at least a portion of the original communication from the first language into at least the second language to generate a translated communication comprises the steps of:

translating at least a portion of the communication from the first language into at least the second language to generate a translated communication; and dispatching a copy of the translation back to the sender.

25. A method for translating an electronic communication transmitted via a computer network as defined in claim 15 wherein the step of associating a value with the at least one translation parameter at the translation site comprises the step of associating a character string with the at least one translation parameter.

26. A method for translating an electronic communication transmitted via a computer network as defined in claim 15 wherein the step of determining at least one translation parameter to be applied to the communication comprises the step of determining at least one translating parameter selected from the group consisting of: the destination address of the original communication; the type of translation to be performed on the original communication; the language of the communication to be translated; the language which the communication is to be translated into; whether a copy of the translation should be dispatched back to the sender for confirmation and/or modification; whether a copy of the final translated communication should be dispatched to the sender.

27. A method for translating an electronic communication transmitted via a computer network as defined in claim 15 wherein the step of translating at least a portion of the communication from the first language into at least the second language to generate a translated communication comprises the steps of:

determining the type of translation which should be carried out on the communication, the type of translation being selected from the group consisting of: legal, medical, technical/engineering, or general types of translation;

identifying the language of the communication to be translated;

determining the language which the communication is to be translated into;

performing a machine translation on at least a portion of the communication from the first language into at least the second language to generate a primary translated communication;

performing a human translation of the primary translation to generate a secondary translation; and performing a spelling check and grammar check on the translation of the communication.

28. A method for translating an electronic communication transmitted via a computer network as defined in claim 15 wherein the step of translating at least a portion of the communication comprises the step of translating an electronic mail message and any attachments to the electronic mail message.

29. A method for translating an electronic communication transmitted via a computer network as defined in claim 15 wherein the first humanly perceptible language is a language selected from the group consisting of: Belarusian, Bulgarian, Czech, Chinese, Danish, Dutch, English, French, German, Italian, Japanese, Korean, Norwegian, Polish, Portuguese, Romanian, Russian, Serbo-Croatian, Slovak, Spanish, Swedish, and Ukrainian and wherein the second humanly perceptible language is a language selected from the group consisting of: Belarusian, Bulgarian, Czech, Chinese, Danish, Dutch, English, French, German, Italian, Japanese, Korean, Norwegian, Polish, Portuguese, Romanian, Russian, Serbo-Croatian, Slovak, Spanish, Swedish, and Ukrainian.

30. A system for translating, from a first humanly perceptible language to at least a second humanly perceptibly language, a communication transmitted via a computer network from an originating site to a destination site, the location of the destination site on the network being designated by at least a first level domain field, a second level domain field, and a username field, the system comprising:

means for preparing an original communication for electronic transmission;

means for providing a destination address for the original communication including a first level domain field, a second level domain field, and a username field;

means for concatenating a translation address onto the destination address, the translation address including a first level domain field and a second level domain field and such that the destination address first level domain field becomes a third level domain field and the second level domain field becomes a fourth level domain field and the username field is retained;

means for dispatching the communication via a communications network to arrive at a translation site designated by the translation address;

means for receiving the communication at the translation site;

means for translating at least a portion of the communication from the first language into at least the second language to generate a translated communication;

means for removing the translation address from the destination address, such that the destination address first level domain field is restored to the first level domain field and the destination address second level domain field is restored to the second level domain field and the username field is retained;

means for dispatching the translated communication via the computer network to arrive at the site designated by the destination field;

means for receiving the translated communication at the site designated by the destination field; and means for reproducing the translated communication in a humanly perceptible manner such that an intended recipient can comprehend the contents of the translated communication.

31. A system for conveying an electronic communication from a sender authoring the communication in a first language at an origination site such that the communication is delivered to a recipient in a second language different from the first language, the system comprising:

means for preparing an original communication for electronic transmission;

means for providing a recipient address for the original communication, the recipient address comprising a destination field;

means for determining at least one translation parameter to be applied to the original communication;

means for dispatching to a translation site designated by a translation address via the communications network the at least one translation parameter;

means for associating a value with the at least one translation parameter at the translation site and returning the value to the origination site;

means for dispatching the original communication from the origination site to the translation site designated by the translation address via the communications network;

means for receiving the original communication with the value associated with the original communication at the translation site;

means for translating at least a portion of the original communication from the first language into at least the second language to generate a translated communication in accordance with the at least one translation parameter;

means for dispatching the translated communication via the computer network to arrive at the site designated by the destination field;

means for receiving the translated communication at the site designated by the destination field; and means for reproducing the translated communication in a humanly perceptible manner such that an intended recipient can comprehend the contents of the translated communication.

\* \* \* \* \*